United States Patent Office 3,394,397
Patented July 23, 1968

3,394,397
N - 4 - BROMO - 2 - METHYLPHENYL - N',N' - DIMETHYLFORMAMIDINE AND PROCESS FOR PREPARING THE SAME
Dieter Duerr, Basel, Hans Aebi, Riehen, and Ludwig Ebner, Stein, Aargau, Switzerland, assignors to Ciba Limited, Basel, Switzerland, a company of Switzerland
No Drawing. Filed Dec. 16, 1965, Ser. No. 514,376
Claims priority, application Switzerland, Dec. 23, 1964, 16,636/64
2 Claims. (Cl. 260—564)

ABSTRACT OF THE DISCLOSURE

Amidines of the formula

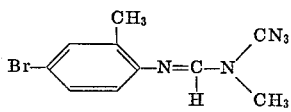

having pesticidal activity, are prepared by manufacturing an amidine of the formula

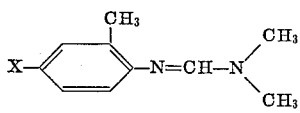

wherein X is hydrogen or bromine according to generally employed procedures and, if X is hydrogen, the said amidine is brominated.

---

The literature describes preparations for combating pests, which comprise as active ingredient, at least one compound of the formula

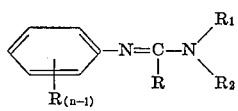

in which formula R represents a halogen atom, a lower alkyl, alkoxy, halogenalkyl group or a phenoxy residue which may be substituted by one or more halogen atoms, or a lower alkyl, alkoxy, or halogenalkyl group, or one of the groups —$CF_3$, —$NO_2$, —CN, —SCN; n represents 1, 2, 3 or 4; $R_1$ represents an alkyl group containing 1 to 3 carbon atoms, and $R_2$ and $R_3$ may be identical or different and each represents hydrogen or a lower alkyl group and $R_1$ and $R_2$, together with the nitrogen atom, may also form members of a heterocyclic system.

The present invention provides an amidine of the formula

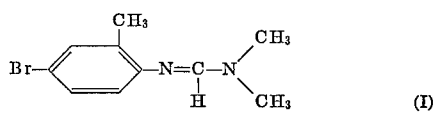

and a process for its manufacture wherein an amidine of the formula

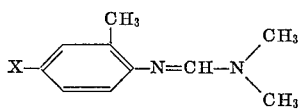

wherein X represents a bromine or hydrogen atom, is manufactured by one of the processes generally used for the formation of formamidine and if in the resulting product X represents hydrogen, this amidine is treated with a brominating agent.

The present invention also provides a preparation for combating harmful organisms of the animal and vegetable kingdoms, which comprise as active ingredient, a compound having the Formula I given above, if desired together with a carrier.

The amidine for the Formula I has an especially strong action against acarides.

In the published German specification No. 1,172,081, there have been described N-phenyl-formamidines that contain, in ortho-position of the phenyl nucleus, a methyl group and in para-position a chlorine atom. These amidines have an acaricidal effect.

The new amidine of this invention combines an excellent acaricidal effect with an unexpectedly good fungicidal effect. Thus, for example, when applied in equal concentrations, the para-chloro compound has no effect against Erysiphe, whereas the para-bromo compound kills off 90% of this organism.

The process of the invention may be carried out by heating a suitably substituted isocyanate with dimethylformamide, during which the progress of the reaction is easy to observe by the carbon dioxide liberated. It goes without saying that other methods, for example, the reaction of the reaction products of dimethylformamide with phosgene, thionylchloride or phosphorus chloride with suitably substituted toluidines, likewise produce the desired results.

Alternatively, according to a modification of the present process ortho-toluidine is first converted into N-(ortho-methylphenyl)-N',N'-dimethylformamidine which is then brominated in the para-position. This subsequent bromination can be carried out, for example, in a simple manner by reacting the amidine formed with bromine in a solvent, for example in glacial acetic acid or in another organic solvent, for example pyridine, dioxane or carbon tetrachloride.

It is also possible, for example, to use as brominating agent an adduct of bromine with pyridine or dioxane.

Unexpectedly, it has now been observed that the bromination favours the para-position almost exclusively. This unitary progress of the bromination could not have been foreseen.

The preparations of this invention are suitable not only for use as acaricides but, when used in a concentration that does not produce phytotoxic effects, they have an outstanding effect against harmful microorganisms, for example, against fungi for example, Alternaria solani, Phytophthora infestans and Septoria apii, which are among the foremost phytopathogens.

In the manufacture of solutions of the compounds of the general Formula I suitable for direct spraying, there may be used petroleum fractions of a high to medium boiling range, for example Diesel oil or kerosene, coal tar oil and oils of vegetable or animal origin, as well as hydrocarbons, for example alkylated naphthalenes or tetrahydronaphthalene, if desired in combination with xylene mixtures, cyclohexanols or ketones; furthermore chlorinated hydrocarbons for example, tetrachloroethane, trichloroethane, trichloroethylene or trichlorobenzenes and tetrachlorobenzenes.

Aqueous forms of applications are advantageously manufactured from emulsion concentrates, pastes or wettable spray powders by addition of water thereto. Suitable emulsifiers or dispersants are nonionic products, for example condensation products of aliphatic alcohols, amines or carboxylic acids comprisng a long chain of about 10 to 20 carbon atoms with ethylene oxide, for example, the condensation product of octadecyl alcohol with 25 to 30 mols of ethylene oxide, or of commercial oleylamine with 15 mols of ethylene oxide, or of dodecylmercaptan with 12 mols of ethylene oxide. Particularly suitable anionic emulsifiers are the sodium salt of dodecyl alcohol sulfuric acid ester, the sodium salt of dodecyl benzenesulfonic acid, the potassium or triethanolamine salt of oleic or abietic acid or of mixtures of these acids, or the sodium salt of a petroleum sulfonic acid. Suitable cationic dispersants are quaternary ammonium compounds for example cetyl pyridinium bromide or dihydroxyethylbenzyl dodecyl ammonium chloride.

Solid vehicles suitable for the manufacture of dusting and scattering preparations are for example, talcum, kaolin, bentonite, calcium carbonate and calcium phosphate, and also coal, cork meal, wood meal and other materials of vegetable origin. It is also very advantageous to manufacture the preparations in granulated form. The different forms of application may further contain the conventional additives that improve the distribution, the adhesion, the stability towards rain or the penetration; as such substances there may be mentioned fatty acids, resins, glue, casein and alginates.

The preparations of this invention may be applied as such or in conjunction or admixture with conventional pesticides, especially insecticides, acaricides, nematocides, bactericides or further fungicides or herbicides.

According to the present invention, the amidine of the Formula I may also be used in gaseous form above all for combating mites (acarides) and their ova.

It is also possible, for example, to combine the amidine with dimethyl-dichlorovinyl phosphate or another suitable phosphoric acid ester to achieve a good action also against insects, for example against aphids. This sphere of application is of special practical importance for the work in the greenhouse.

The following examples illustrate the invention:

Example 1.—N-4-bromo-2-methylphenyl-N', N'-dimethylformamidine (a) 80 grams of dimethylformamide are mixed with 130 g. of thionyl chloride at 20° C. with cooling and exclusion of moisture. When all thionyl chloride has been added, 100 ml. of benzene are added and the mixture is stirred for 2 hours at 40° C. Then in the course of 30 minutes, a solution of 107 g. of ortho-toluidine in 200 ml. of benzene is added drop by drop, and the reaction mixture is refluxed for 4 hours, then allowed to cool, rendered alkaline with 10 N-sodium hydroxide solution, and the organic layer is separated. On fractional distillation, it yields 137 g. of N-(ortho-methylphenyl)-N',N'-dimethylformamidine, boiling at 131 to 132° C. under 13 mm. Hg pressure. 52 grams of this compound are dissolved in 150 ml. of glacial acetic acid, heated to 80° C. and in the course of 1½ hours, a solution of 51.3 g. of bromine in 50 ml. of glacial acetic acid is added drop by drop. The heating bath is then removed and after 2 hours, the solvent is evaporated under vacuum. The residue is rendered alkaline with 10 N-sodium hydroxide solution and the oil which has settled out is taken up in methylene chloride.

On the fractional distillation, this oil yields 49 g. of product boiling at 95 to 97° C. under 0.04 mm. Hg pressure.

(b) 80 grams of dimethylformamide in ½ liter of toluene are mixed with 109 g. of phosgene at 0 to 5° C. with exclusion of moisture. The resulting white crystalline magma is mixed within 30 minutes with a solution of 186 g. of 4-bromo-2-methylaniline in 300 ml. of toluene, and the reaction mixture is then refluxed for 4 to 6 hours, allowed to cool, rendered alkaline with sodium hydroxide solution of 30% strength and the organic layer formed is collected and fractionated under vacuum. In this manner, the desired product is obtained in an excellent yield.

(c) 40 grams of bromine are stirred within one hour at −10° C. to 5° C. into a solution of 40.5 g. of N-(ortho-methylphenyl)-N',N'-dimethylformamidine in ½ liter of pyridine. The resulting thin crystalline magma is concentrated under vacuum after one hour. The residue is stirred with 200 ml. of ice water and 200 ml. of benzene, rendered alkaline with sodium hydroxide solution of 30% strength, and the organic layer is separated, dried with sodium sulfate, filtered and evaporated and the residue distilled over a column, to yield 48.3 g. of the product boiling at 105° C. under 0.09 mm. Hg pressure.

(d) 40.5 grams of N-(ortho-methylphenyl-N',N'-dimethylformamidine in ½ liter of carbon tetrachloride are stirred with 44.5 g. of N-bromosuccinimide under anhydrous conditions. At the beginning, the reaction is exothermic, and one hour later the batch is raised to reflux by supplying external heat. After 4 hours, the batch is allowed to cool, the succinimide formed is filtered off, the filtrate evaporated and the residue is distilled under vacuum over a column, to yield 57.1 g. of the brominated product boiling at 103° C. under 0.08 mm. Hg pressure.

(e) 40.5 grams of N-(ortho-methylphenyl)-N',N'-dimethylformamidine are dissolved in 300 ml. of dioxane and in the course of one hour while stirring at 5° to 10° C., a suspension of the dioxane/bromine adduct, obtained by mixing in the cold 40 g. of bromine with 200 ml. of dioxane, is added. The crystalline magma formed is concentrated under vacuum after 4 hours. The residue is treated as described under (a) above.

Example 2

20 grams of the formamidine prepared as described in Example 1 are mixed with 20 g. of an emulsifier soluble in xylene (for example, "Toximul Q" may be used) and made up with xylene to a volume of 100 ml. In this manner, an emulsion concentrate of 20% strength is obtained, which can be diluted with water in any desired proportion.

Example 3

To test the acaricidal effect of the preparation of Example 2, bean plants (*Phaseolus vulgaris*) at the two-leaf stage were covered 12 hours prior to the test with pieces of leaves infested by the culture. 12 hours later all mobile stages of the red spider mite (*Tetranychus telarius*) had migrated and the adult females had laid eggs. The plants infested in this manner were then thoroughly wetted with a fine spray of the emulsified xylene solution of Example 2. (Concentration of active substance: 0.08%.) The effect was examined 2 and 7 days later and revealed the following values of killed-off acarides:

|  | Percent | | |
| --- | --- | --- | --- |
|  | Ova | Larvae | Adults |
| After 2 days |  | 100 | 100 |
| After 7 days | 90–100 | 100 | 100 |

With the compound of Example 1, a strong gastrotoxic effect on insects was observed.

A control effect of up to 60% was observed after 5 days on leaf beetles (*Gastroidia viridula*).

What is claimed is:
1. The formamidine of the formula

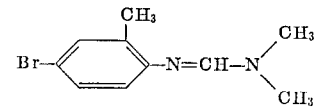

2. A process for the manufacture of the amidine claimed in claim 1 wherein the amidine of the formula

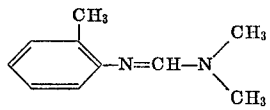

is brominated with a brominating agent selected from the group consisting of bromine, a pyridine/bromine adduct and a dioxane/bromine adduct.

References Cited

UNITED STATES PATENTS 1,930,754 10/1933 Havas et al. _____ 260—578 XR

FOREIGN PATENTS 1,172,081 6/1964 Germany.
1,353,726 1/1964 France.

CHARLES B. PARKER, *Primary Examiner.*
R. V. HINES, *Assistant Examiner.*